(12) United States Patent
Langen et al.

(10) Patent No.: US 8,112,525 B2
(45) Date of Patent: Feb. 7, 2012

(54) ENGINE NEAR CACHE FOR REDUCING LATENCY IN A TELECOMMUNICATIONS ENVIRONMENT

(75) Inventors: Anno R. Langen, Berkeley, CA (US); Rao Nasir Khan, Fremont, CA (US); John D. Beatty, Redwood City, CA (US); Ioannis Cosmadopoulos, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 11/748,791

(22) Filed: May 15, 2007
(Under 37 CFR 1.47)

(65) Prior Publication Data
US 2009/0019158 A1    Jan. 15, 2009

Related U.S. Application Data

(60) Provisional application No. 60/801,083, filed on May 16, 2006.

(51) Int. Cl.
*G06F 15/173* (2006.01)
(52) U.S. Cl. ................ 709/226; 709/227; 709/223
(58) Field of Classification Search .......... 709/226, 709/227, 223
See application file for complete search history.

(56) References Cited

U.S. PATENT DOCUMENTS

| | | | |
|---|---|---|---|
| 5,325,360 A | 6/1994 | Friedrich | |
| 5,590,288 A | 12/1996 | Castor et al. | |
| 5,659,596 A | 8/1997 | Dunn | |
| 5,675,800 A | 10/1997 | Fisher et al. | |
| 5,832,487 A | 11/1998 | Olds et al. | |
| 5,963,974 A | 10/1999 | Arimilli et al. | |
| 6,052,724 A | 4/2000 | Willie et al. | |
| 6,067,301 A | 5/2000 | Aatresh | |
| 6,208,870 B1 | 3/2001 | Lorello et al. | |
| 6,226,686 B1 | 5/2001 | Rothschild et al. | |
| 6,279,076 B1 * | 8/2001 | Shishido et al. | 711/113 |
| 6,292,833 B1 | 9/2001 | Liao et al. | |
| 6,304,949 B1 | 10/2001 | Houlsdworth | |
| 6,480,862 B1 | 11/2002 | Gall | |

(Continued)

OTHER PUBLICATIONS

Kristensen, A., "SIP Servlet API Version 1.0," Internet article [online], Feb. 4, 2003, http://jcp.org/entisr/detail?id=116> [retrieved on Mar. 6, 2009], p. 1—section 1, p. 4—section 1.4.2.

(Continued)

*Primary Examiner* — Quang N. Nguyen
*Assistant Examiner* — Kostas Katsikis
(74) *Attorney, Agent, or Firm* — Fliesler Meyer LLP

(57) ABSTRACT

The SIP server can be comprised of an engine tier and a state tier distributed on a cluster network environment. The engine tier can send, receive and process various messages. The state tier can maintain in-memory state data associated with various SIP sessions. A near cache can be residing on the engine tier in order to maintain a local copy of a portion of the state data contained in the state tier. Various engines in the engine tier can determine whether the near cache contains a current version of the state needed to process a message before retrieving the state data from the state tier. Accessing the state from the near cache can save on various latency costs such as serialization, transport and deserialization of state to and from the state tier. Furthermore, the near cache and JVM can be tuned to further improve performance of the SIP server.

14 Claims, 9 Drawing Sheets

U.S. PATENT DOCUMENTS

| | | |
|---|---|---|
| 6,578,076 B1 | 6/2003 | Putzolu |
| 6,611,867 B1 | 8/2003 | Bowman-Amuah |
| 6,621,793 B2 | 9/2003 | Widegren et al. |
| 6,701,519 B1 | 3/2004 | Cowan |
| 6,704,933 B1 | 3/2004 | Tanaka et al. |
| 6,708,206 B1 | 3/2004 | Thrane et al. |
| 6,721,286 B1* | 4/2004 | Williams et al. ............. 370/282 |
| 6,747,970 B1 | 6/2004 | Lamb et al. |
| 6,801,604 B2 | 10/2004 | Maes et al. |
| 6,862,689 B2 | 3/2005 | Bergsten et al. |
| 6,888,828 B1 | 5/2005 | Partanen et al. |
| 6,961,776 B1 | 11/2005 | Buckingham et al. |
| 6,965,777 B1 | 11/2005 | Cast et al. |
| 6,988,133 B1 | 1/2006 | Zavalkovsky et al. |
| 7,039,037 B2 | 5/2006 | Wang et al. |
| 7,050,424 B2 | 5/2006 | Cheng et al. |
| 7,058,046 B2 | 6/2006 | Celi, Jr. et al. |
| 7,076,562 B2 | 7/2006 | Singhal et al. |
| 7,082,102 B1 | 7/2006 | Wright |
| 7,089,307 B2* | 8/2006 | Zintel et al. ................. 709/224 |
| 7,142,876 B2 | 11/2006 | Trossen et al. |
| 7,283,539 B2 | 10/2007 | Wang et al. |
| 7,301,905 B1 | 11/2007 | Tontiruttananon et al. |
| 7,380,073 B2* | 5/2008 | Shorb ............................ 711/152 |
| 7,464,178 B2 | 12/2008 | Corrigan et al. |
| 7,529,805 B2 | 5/2009 | Martinez et al. |
| 7,554,992 B2 | 6/2009 | Kimura et al. |
| 7,813,299 B2 | 10/2010 | Yumoto et al. |
| 2001/0030970 A1 | 10/2001 | Wiryaman et al. |
| 2002/0036983 A1 | 3/2002 | Widegren et al. |
| 2002/0039352 A1 | 4/2002 | El-Fekih et al. |
| 2002/0048269 A1 | 4/2002 | Hong et al. |
| 2002/0065034 A1 | 5/2002 | Zhang |
| 2002/0073211 A1 | 6/2002 | Lin et al. |
| 2002/0073404 A1 | 6/2002 | Sokolov et al. |
| 2002/0075844 A1 | 6/2002 | Hagen |
| 2002/0077134 A1 | 6/2002 | Mizell et al. |
| 2002/0129174 A1 | 9/2002 | LaBaw |
| 2002/0144119 A1 | 10/2002 | Benantar |
| 2002/0147749 A1 | 10/2002 | Ortiz et al. |
| 2002/0159387 A1 | 10/2002 | Allison et al. |
| 2003/0033524 A1 | 2/2003 | Tran et al. |
| 2003/0055920 A1 | 3/2003 | Kakadia et al. |
| 2003/0093695 A1 | 5/2003 | Dutta |
| 2003/0095540 A1 | 5/2003 | Mulligan et al. |
| 2003/0120593 A1 | 6/2003 | Bansal et al. |
| 2003/0125021 A1 | 7/2003 | Tell et al. |
| 2003/0131116 A1 | 7/2003 | Jain et al. |
| 2003/0165135 A1 | 9/2003 | Itzkovitz et al. |
| 2003/0227894 A1 | 12/2003 | Wang et al. |
| 2003/0227926 A1 | 12/2003 | Ramamurthy et al. |
| 2004/0002881 A1 | 1/2004 | Hu et al. |
| 2004/0086102 A1 | 5/2004 | McMurry et al. |
| 2004/0116117 A1 | 6/2004 | Ahvonen et al. |
| 2004/0117794 A1 | 6/2004 | Kundu |
| 2004/0139204 A1 | 7/2004 | Ergezinger et al. |
| 2004/0148357 A1 | 7/2004 | Corrigan et al. |
| 2004/0152439 A1 | 8/2004 | Kimura et al. |
| 2004/0160911 A1 | 8/2004 | Zilliacus et al. |
| 2004/0168162 A1 | 8/2004 | Park et al. |
| 2004/0172421 A1 | 9/2004 | Saito et al. |
| 2004/0196858 A1 | 10/2004 | Tsai et al. |
| 2004/0213156 A1 | 10/2004 | Smallwood et al. |
| 2004/0218619 A1 | 11/2004 | Salo |
| 2004/0223602 A1 | 11/2004 | Honkasalo et al. |
| 2004/0230682 A1 | 11/2004 | Immonen |
| 2004/0233866 A1 | 11/2004 | Bossoli et al. |
| 2004/0246822 A1 | 12/2004 | Wong |
| 2004/0246947 A1 | 12/2004 | Wong |
| 2004/0258238 A1 | 12/2004 | Wong |
| 2004/0267882 A1 | 12/2004 | Whynot et al. |
| 2005/0005022 A1 | 1/2005 | Taylor |
| 2005/0022210 A1* | 1/2005 | Zintel et al. ................. 719/318 |
| 2005/0025050 A1 | 2/2005 | Roeder |
| 2005/0044188 A1 | 2/2005 | Nakazawa et al. |
| 2005/0044233 A1 | 2/2005 | Cai et al. |
| 2005/0091362 A1 | 4/2005 | Shigeta et al. |
| 2005/0097367 A1 | 5/2005 | Nakazawa et al. |
| 2005/0117576 A1* | 6/2005 | McDysan et al. ............. 370/389 |
| 2005/0117602 A1 | 6/2005 | Carrigan et al. |
| 2005/0152336 A1 | 7/2005 | Bratt et al. |
| 2005/0174950 A1 | 8/2005 | Ayyagari |
| 2005/0185661 A1 | 8/2005 | Scott et al. |
| 2005/0203994 A1 | 9/2005 | Palmer et al. |
| 2005/0207432 A1 | 9/2005 | Velez-Rivera et al. |
| 2005/0226225 A1 | 10/2005 | Shigeta |
| 2005/0237999 A1 | 10/2005 | Shores et al. |
| 2005/0259806 A1 | 11/2005 | Chang |
| 2005/0265276 A1* | 12/2005 | Takeda et al. ................. 370/328 |
| 2005/0281251 A1 | 12/2005 | Yumoto et al. |
| 2006/0002333 A1 | 1/2006 | Skog et al. |
| 2006/0010224 A1 | 1/2006 | Sekar et al. |
| 2006/0069776 A1 | 3/2006 | Shim et al. |
| 2006/0090097 A1 | 4/2006 | Ngan et al. |
| 2006/0109818 A1 | 5/2006 | Ramanna et al. |
| 2006/0128409 A1 | 6/2006 | Gress et al. |
| 2006/0174271 A1* | 8/2006 | Chen et al. ..................... 725/39 |
| 2006/0225108 A1 | 10/2006 | Tabassi et al. |
| 2006/0233182 A1 | 10/2006 | Appanna et al. |
| 2006/0288086 A1 | 12/2006 | Gopalakrishnan et al. |
| 2007/0005766 A1 | 1/2007 | Singhal et al. |
| 2007/0011617 A1 | 1/2007 | Akagawa et al. |
| 2007/0169170 A1 | 7/2007 | Shiran |
| 2007/0195779 A1 | 8/2007 | Judge et al. |
| 2007/0208862 A1 | 9/2007 | Fox et al. |
| 2007/0288915 A1 | 12/2007 | Zotter et al. |
| 2008/0021939 A1 | 1/2008 | Dahlstedt et al. |
| 2008/0086573 A1 | 4/2008 | Martinez et al. |
| 2008/0098117 A1 | 4/2008 | Fukuhara et al. |
| 2008/0144630 A1 | 6/2008 | Hayashida et al. |
| 2008/0147551 A1 | 6/2008 | Connelly |
| 2008/0189421 A1 | 8/2008 | Langen et al. |
| 2008/0225835 A1 | 9/2008 | Oda et al. |
| 2008/0256257 A1 | 10/2008 | Miller et al. |
| 2008/0294731 A1 | 11/2008 | Roy |

OTHER PUBLICATIONS

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

Zhuang et al., Policy Based QoS Architecture in the IP Multimedia Subsystem of UMTS, IEEE Network, May/Jun. 2003, pp. 51-57.

International Search Report and Written Opinion for PCT/US06/11429 dated Aug. 7, 2007, 7 pages.

International Search Report and Written Opinion for PCT/US06/11165 dated Oct. 22, 2007, 7 pages.

International Search Report and Written Opinion for PCT/US07/69021 dated Jul. 25, 2008, 10 pages.

International Search Report and Written Opinion for PCT/US07/69023 dated Aug. 25, 2008, 8 pages.

Fasel et al., "The FOKUS Open SIP AS—A Service Platform for NGN," Mar. 2005, IN Proceedings Kommunikation in Verteilten Systemen (KiVS), pp. 49-56.

Olsen et al., "SIP Servlet Discussion," 2003, org.apache.tomcat.dev listserv archives; pp. 1-5, retrieved at http://markmail.org/search/?q=sip+servlet+httpsession+date%3A199811-200605 on Nov. 3, 2010.

Coward et al., Java Servlet Specification v2.4, Nov. 24, 2003, pp. 1-330.

Kristensen et al., SIP Servlet API v1.0, Feb. 4, 2003, pp. 2-3, 5-120.

Rosenberg et al., Best Current Practices for Third Party Call Control in the SIP, Apr. 2004, Network Working Group, RFC 3725, pp. 1-32.

Magedanz et al., The IMS Playground @ FOKUS—An Open Testbed for Generation Network Multimedia Services, Feb. 23-25, 2005, pp. 1, 6.

* cited by examiner

ENGINE NEAR CACHE FOR REDUCING LATENCY IN A TELECOMMUNICATIONS ENVIRONMENT

CLAIM OF PRIORITY

The present application claims the benefit of U.S. Provisional Patent Application No. 60/801,083, entitled ENGINE NEAR CACHE FOR REDUCING LATENCY IN A TELECOMMUNICATIONS ENVIRONMENT, by Anno R. Langen et al., filed on May 16, 2006, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer et al., filed on Mar. 17, 2006;

U.S. Provisional Patent Application No. 60/801,091 entitled SIP AND HTTP CONVERGENCE IN NETWORK COMPUTING ENVIRONMENTS, by Anno R. Langen et al., filed on May 16, 2006;

U.S. Provisional Patent Application No. 60/800,943 entitled HITLESS APPLICATION UPGRADE FOR SIP SERVER ARCHITECTURE, by Anno R. Langen et al., filed on May 16, 2006;

U.S. patent application Ser. No. 11/434,022 entitled SYSTEM AND METHOD FOR CONTROLLING DATA FLOW BASED UPON A TEMPORAL POLICY, by Narendra Vemula et al., filed on May 15, 2006;

U.S. patent application Ser. No. 11/434,024 entitled SYSTEM AND METHOD FOR CONTROLLING ACCESS TO LEGACY PUSH PROTOCOLS BASED UPON A POLICY, by Bengt-Inge Jakobsson et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas E. Jansson, filed on May 15, 2006;

U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas E. Jansson, filed on May 15, 2006;

U.S. patent application Ser. No. 11/432,934 entitled SYSTEM AND METHOD FOR SHAPING TRAFFIC, by Jan Thomas Svensson, filed on May 12, 2006.

FIELD OF THE INVENTION

The current invention relates generally to managing telecommunications and more particularly to providing a near cache for reducing latency in a cluster network environment.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, latency has been an important issue in addressing the processing of telecommunications, as more and more users expect seemingly instantaneous access from their devices.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there is provided an engine-near cache in a session initiation protocol (SIP) server architecture for improving latency and reducing various time costs in processing messages. In various embodiments, the SIP server can be comprised of an engine tier and a state tier distributed on a cluster network environment. The engine tier can send, receive and process various messages. The state tier can maintain in-memory state data associated with various SIP sessions. A near cache can be residing on the engine tier in order to maintain a local copy of a portion of the state data contained in the state tier. Various engines in the engine tier can determine whether the near cache contains a current version of the state needed to process a message before retrieving the state data from the state tier. Accessing the state from the near cache can save on various latency costs such as serialization, transport and deserialization of state to and from the state tier. Furthermore, the near cache can be tuned to further improve performance of the SIP server.

Figure 1A:
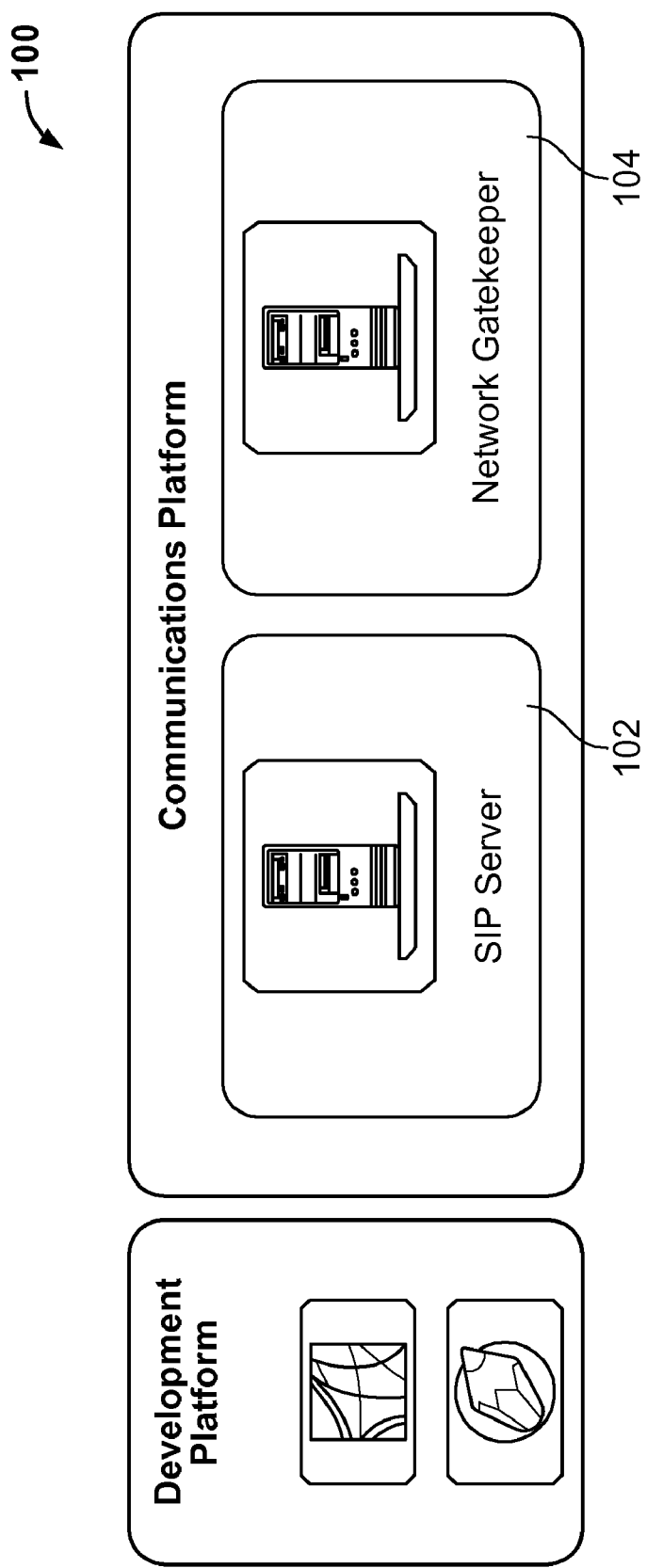
FIG. 1A is an exemplary illustration of a functional system layers in various embodiments.

FIG. 1A is an exemplary illustration of functional system layers in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A Session Initiation Protocol (SIP) Server 102 and a Network Gatekeeper 104 can comprise a portfolio of products that collectively make up the Communications Platform 100. The SIP Server 102 provides the Communications Platform 100 with a subsystem in which application components that interact with SIP-based networks may be deployed. The Network Gatekeeper 104 provides a policy-driven telecommunications Web services gateway that allows granular control over access to network resources from un-trusted domains.

Figure 1B:
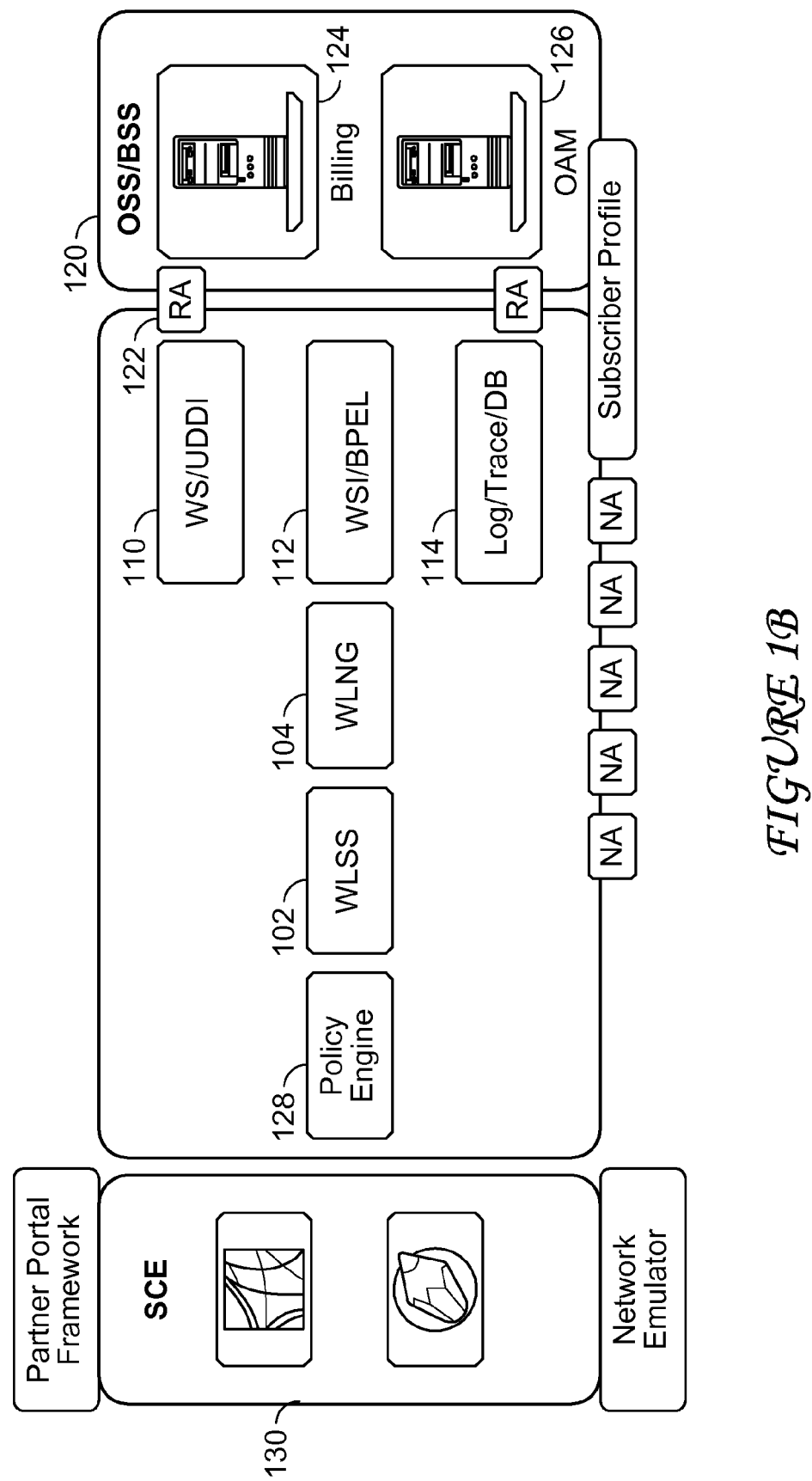
FIG. 1B is another exemplary illustration of functional system layers in a communications platform embodiment.

A variety of shared and re-usable software and service infrastructure components comprise the Communications Platform 100. For example, an Application Server, such as the WebLogic™ Application Server by BEA Systems, Inc. of San Jose, Calif. This Application Server may be augmented and adapted for deployment in telecommunications networks, while providing many features and functionality of the WebLogic Server counterpart widely deployed in enterprise computing environments. Application Server embodiments for use in the telecommunications applications can provide a variety of additional features and functionality, such as without limitation:

Optimized for Peak Throughput
    Clustering for Scalability and High-Performance
    Generalized for wide range of target platforms (HW/OS) support
    Extensive deployment configuration options
    Optimized for local management
    Plug and play Enterprise Information Systems (EIS) support Analogously, communications platform embodiments can provide a variety of additional features and functionality, such as without limitation:

Highly Deterministic Runtime Environment
    Clustering for High-Availability (HA) and Scalability
    Optimized for Telecom HW/OS/HAM W platforms support (SAF, ATCA, HA M/W, etc.)
    Hardened configuration
    Optimized for Telecom NMS integration
    Telecommunications network connectors and interfaces
    Partitioning, replication and failover FIG. 1B is another exemplary illustration of functional system layers in a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a SIP Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the Communications Platform 100 can interface with an OSS/BSS system 120 via resource adapters 122. Such interfaces can provide access to billing applications 124, Operation, Administration, and Maintenance (OAM) applications 126 and others. A policy engine 128 can control the activities of the above-described components which can be implemented in a scalable cluster environment (SCE) 130.

A Communications Platform embodiment can provide an open, high performance, software based fault-tolerant platform that allows operators to maximize revenue potential by shortening time to market and significantly reducing per-service implementation and integration cost and complexity. The Communications Platform is suitable for use by for Network Infrastructure Vendor, Network Operators and Communications Service Providers in multiple deployment scenarios ranging from fully IMS oriented network architectures to hybrid and highly heterogeneous network architectures. It is not restricted to use only in carrier networks, however, and may be deployed in Enterprise communications networks without restriction or extensive customization. When deployed in conjunction with an IP Multimedia Subsystem, the Communications Platform can serve in the role of an IMS SIP Application Server and offers Communications Service Providers an execution environment in which to host applications (such as the WebLogic Network Gatekeeper), components and standard service enablers.

Figure 1C:
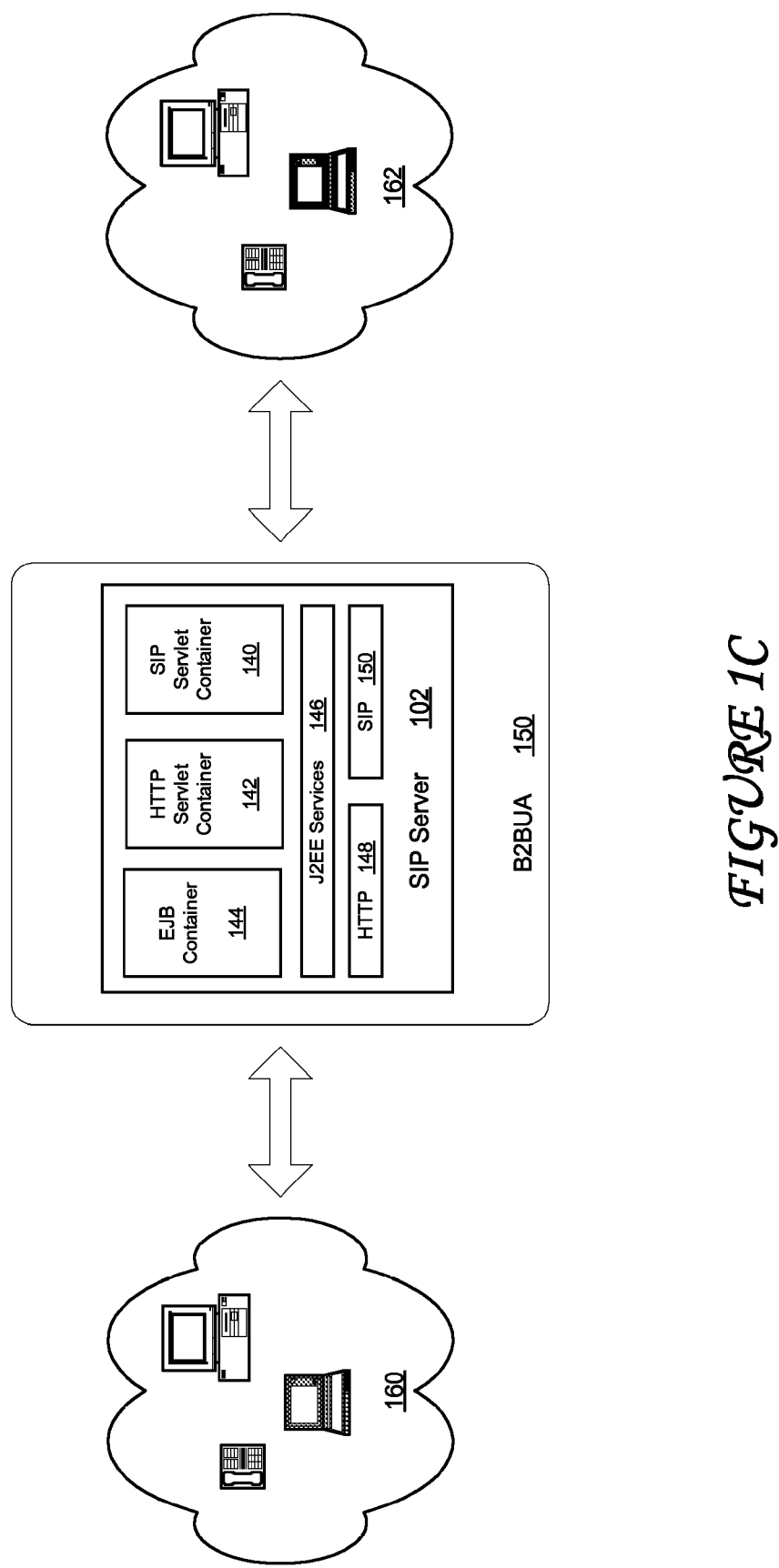
FIG. 1C is an exemplary illustration of a SIP server deployed in a production environment, in accordance with various embodiments.

FIG. 1C is an exemplary illustration of a SIP server deployed in a production environment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the SIP server 102 can be used as a back-to-back user agent (B2BUA) 150 in a typical telecommunications environment. A B2BUA can take the place of an intermediary between communications between user agents 160, 162, including various cellular phones, wireless devices, laptops, computers, applications, and other components capable of communicating with one another electronically. The B2BUA 150 can provide multiple advantages, including controlling the flow of communication between user agents, enabling different user agents to communicate with one another (e.g. a web application can communicate with a cellular phone), as well as various security advantages. As an illustration, the user agents can transmit to the SIP server instead of communicating directly to each other and thus malicious users can be prevented from sending spam and viruses, hacking into other user agent devices, and otherwise compromising security.

The SIP server 102 can be implemented as a Java Enterprise Edition application server that has been extended with support for the session initiation protocol (SIP) as well as other operational enhancements that allow it to meet the demanding requirements of the next generation protocol-based communication networks. In one embodiment, the SIP server 102 can include an Enterprise Java Beans (EJB) container 144, a Hyper Text Transfer Protocol (HTTP) servlet container 142, an SIP servlet container 140, various Java 2 Enterprise Edition (J2EE) services 146, and SIP 150 and HTTP 148 components. The SIP stack of the server can be fully integrated into the SIP servlet container 140 and can offer much greater ease of use than a traditional protocol stack. A SIP servlet Application Programming Interface (API) can be provided in order to expose the full capabilities of the SIP protocol in the Java programming language. The SIP servlet API can define a higher layer of abstraction than simple protocol stacks provide and can thereby can free up the developer from concern about the mechanics of the SIP protocol itself. For example, the developer can be shielded from syntactic validation of received requests, handling of transaction layer timers, generation of non application related responses, generation of fully-formed SIP requests from request objects (which can involve correct preparation of system headers and generation of syntactically correct SIP messages) and handling of lower-layer transport protocols such as TCP, UDP or SCTP.

In one embodiment, the container is a server software that hosts applications (i.e. contains them). In the case of a SIP container, it hosts SIP applications. The container can perform a number of SIP functions as specified by the protocol thereby taking the burden off the applications. At the same time, the SIP container can expose the application to SIP protocol messages (via the SIP Servlet API) on which applications can perform various actions. Different applications can thus be coded and deployed to the container that provides various telecommunication and multimedia services.

Figure 2:
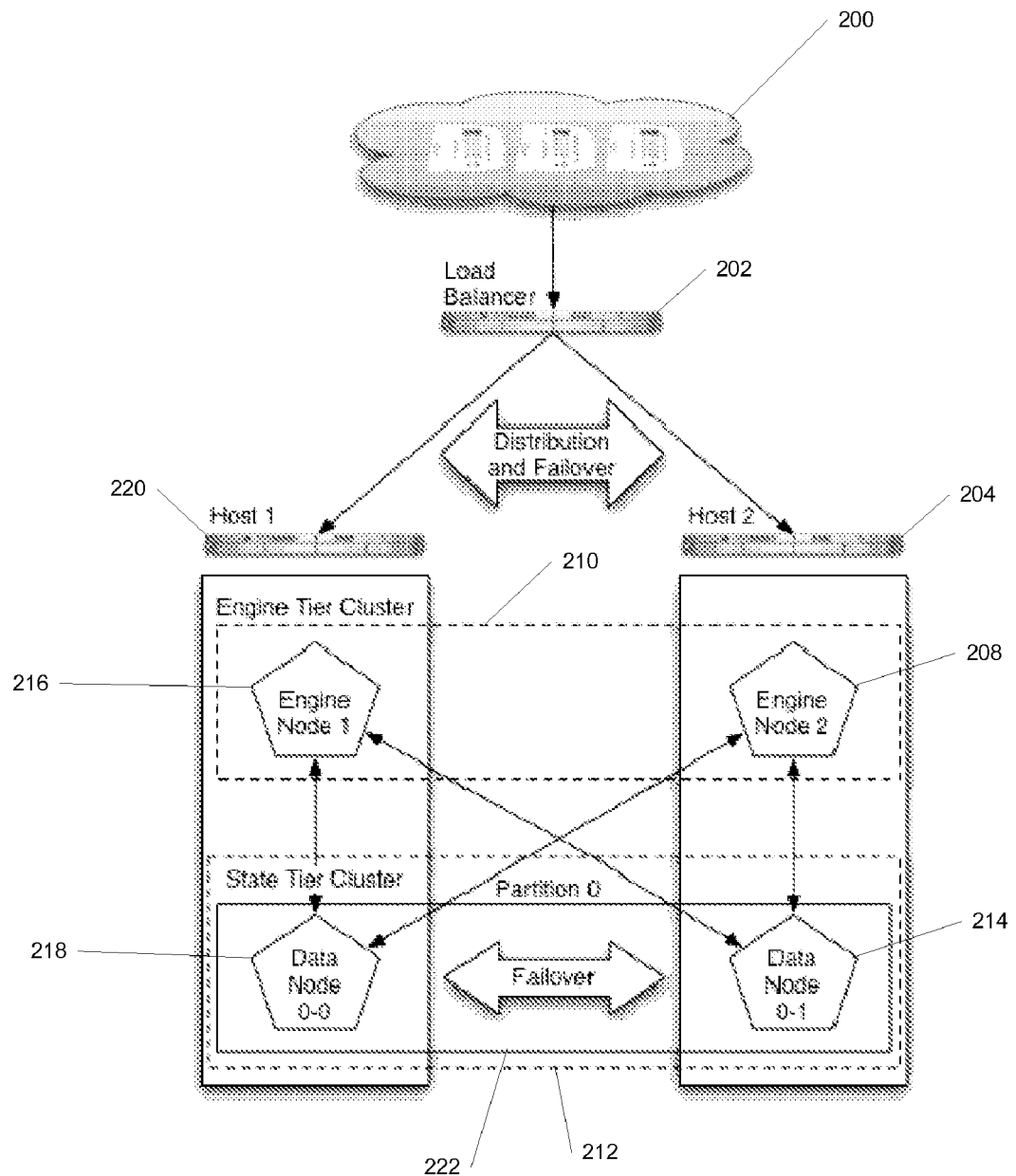
FIG. 2 is an exemplary illustration of the SIP server cluster architecture in accordance with various embodiments of the invention.

FIG. 2 is an exemplary illustration of the SIP server cluster architecture in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means. For example, while the FIG. 2 shows Host A implementing both an engine node and a data node, this should not be construed as limiting the invention. In many cases, it can be preferable to distribute the engine node and data node onto separate host machines. Similarly, while FIG. 2 illustrates two host machines, it is possible and even advantageous to implement many more such hosts in order to take advantage of distribution, load balancing and failover that such a system can provide.

As illustrated, a message, such as a phone call request or some other transfer of data associated with SIP, can come into the cluster from the internet (such as over VoIP), phone, or some other type of network 200. This message can be received and handled by a load balancer 202 which can be responsible distributing message traffic across the engines (such as engine node 1 216 and engine node 2 208) in the cluster. The load balancer can be a standard load balancing appliance hardware device and it is not necessary that it be SIP aware; there is no requirement that the load balancer support affinity between the engines 216, 208, and SIP dialogs or transactions. However in alternative embodiments, certain advantages may be obtained by implementing a SIP-aware load balancer, as discussed in further detail below. Alternatively, the load balancer can be implemented as software that distributes the messages to the various engines. In the various embodiments, the primary goal of the load balancer 202 can be to provide a single public address that distributes incoming SIP requests to available servers in the SIP server engine tier 210. Such distribution of requests can ensure that the SIP server engines are fully utilized. The load balancer 202 can also be used for performing maintenance activities such as upgrading individual servers or applications without disrupting existing SIP clients.

In one embodiment, the SIP server can provide a two-tier cluster architecture model to handle the incoming messages. In this model, a stateless engine tier 210 can process all signaling traffic and can also replicate transaction and session state to the state tier 212 and its partitions 222. Each partition 222 can consist of any number of nodes (replicas) 218, 214 distributed across any number of hosts such as host 1 220 and host 2 204 which can be implemented as computers linked in a cluster type network environment. The state tier 212 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

The engine tier 210 can be implemented as a cluster of SIP server instances that hosts the SIP servlets which provide various features to SIP clients. In one embodiment, the engine tier 210 is stateless, meaning that most SIP session state information is not persisted in the engine tier, but is obtained by querying the state tier 212 which can in turn provide replication and failover services for SIP session data. In alternative embodiments, the engine tier can have state maintained in a local near cache for improving latency.

The primary goal of the engine tier 210 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier 212 can be implemented as a cluster of SIP server instances that provides a high-performance, highly-available, in-memory store for maintaining and retrieving session state data for SIP servlets. This session data may be required by SIP applications in the SIP server engine tier 210 in order to process incoming messages. Within the state tier 212, session data can be managed in one or more partitions 222, where each partition manages a fixed portion of the concurrent call state. For example, in a system that uses two partitions, the first partition could manage one half of the concurrent call state (e.g. A-M) and the second partition can manage the other half (e.g. N-Z). With three partitions, each can manage a third of the call state and so on. Additional partitions can be added as needed to manage large number of concurrent calls.

In one embodiment, within each partition 222, multiple servers can be added to provide redundancy and failover should the other servers in the partition fail. When multiple servers participate in the same partition 222, those servers can be referred to as replicas because each server maintains a duplicate copy of the partition's call state. For example, nodes 218 and 214 of the partition 222 can be implemented as replicas. Furthermore, to increase the capacity of the state tier 212, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas 214, 218 can join and leave the partition 222 and each replica can serve as exactly one partition at a time. Thus, in one embodiment, the total available call state storage capacity of the cluster is a summation of the capacities of each partition 222.

In one embodiment, each partition 222 can peer-replicated, meaning that clients perform all operations (reads/writes) to all replicas 218, 214 in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better failover characteristics as well, since there does not need to be change propagation delay.

In one embodiment, the engine nodes 208, 216 can be responsible for executing the call processing. Each call can have a call state associated with it. This call state can contain various information associated with the call, such as the ids of the caller/callee, where the caller is, what application is running on the callee, any timer objects that may need to fire in order to process the call flow (as discussed below), as well as any other data that may correlate to a call or a message. The state for each call can be contained in the state tier 212. The engine tier 210, on the other hand, could be stateless in order to achieve the maximum performance. In alternative embodiments, however, the engine tier can have certain amounts of state data stored thereon at various times.

In one embodiment, a typical message processing flow can involve locking/getting the call state, processing the message and then putting/unlocking the call state. The operations supported by the replicas for normal operations can include:

lock and get call state
put and unlock call state
lock and get call states with expired timers In various embodiments, the engine tier can maintain mainly short lived objects and any long lived objects which may be needed for message processing can be stored on the state tier. This can provide improvements in latency during garbage collection. As an illustration, the Java Virtual Machine (JVM) garbage collector can safely and quickly remove the short lived objects from memory without interfering with the execution of various other threads which may be in the process of executing. The longer lived objects, on the other hand, are not as easily removed by the garbage collector (since they may be referenced and depended on by various entities) and thus in some cases, the JVM garbage collector may need to stop processing all threads in order to safely perform its garbage collection. This is due in part to the scoping of the short lived and long lived objects. Short lived objects typically exist in a different (more localized) memory scope than the long lived objects, which may be referenced by more entities. Thus, it can be more difficult for garbage collectors to ensure that every executing entity has finished using the long lived objects and various threads are usually stopped in order to perform their regular garbage collection. This can introduce latency.

In order to deal with such issues, the engine tier can maintain mostly short lived objects. In cases where longer lived objects are needed by the engine tier, they can be retrieved from the state tier, used as short lived objects in the engine tier, and subsequently pushed back to the state tier. This can be advantageous in that garbage collection can cause lesser interference with thread execution in the engine tier.

In various embodiments, the state tier 212 can maintain call state in various data objects residing in the random access memory (RAM) of a computer. This can provide significant access speed advantages to the engine tier 210 over the use of a database. Alternatively, if latency is not an issue, call state can be maintained in a database or some other form of persistent store, which can be accessed (albeit slower) by the engine tier. State of various applications running on the SIP server can also be maintained on the state tier. Developers can be provided an API to allow their applications to access the state tier and to store various data thereon for later access by various applications. Alternatively, application state may be stored in a database.

Figure 3:
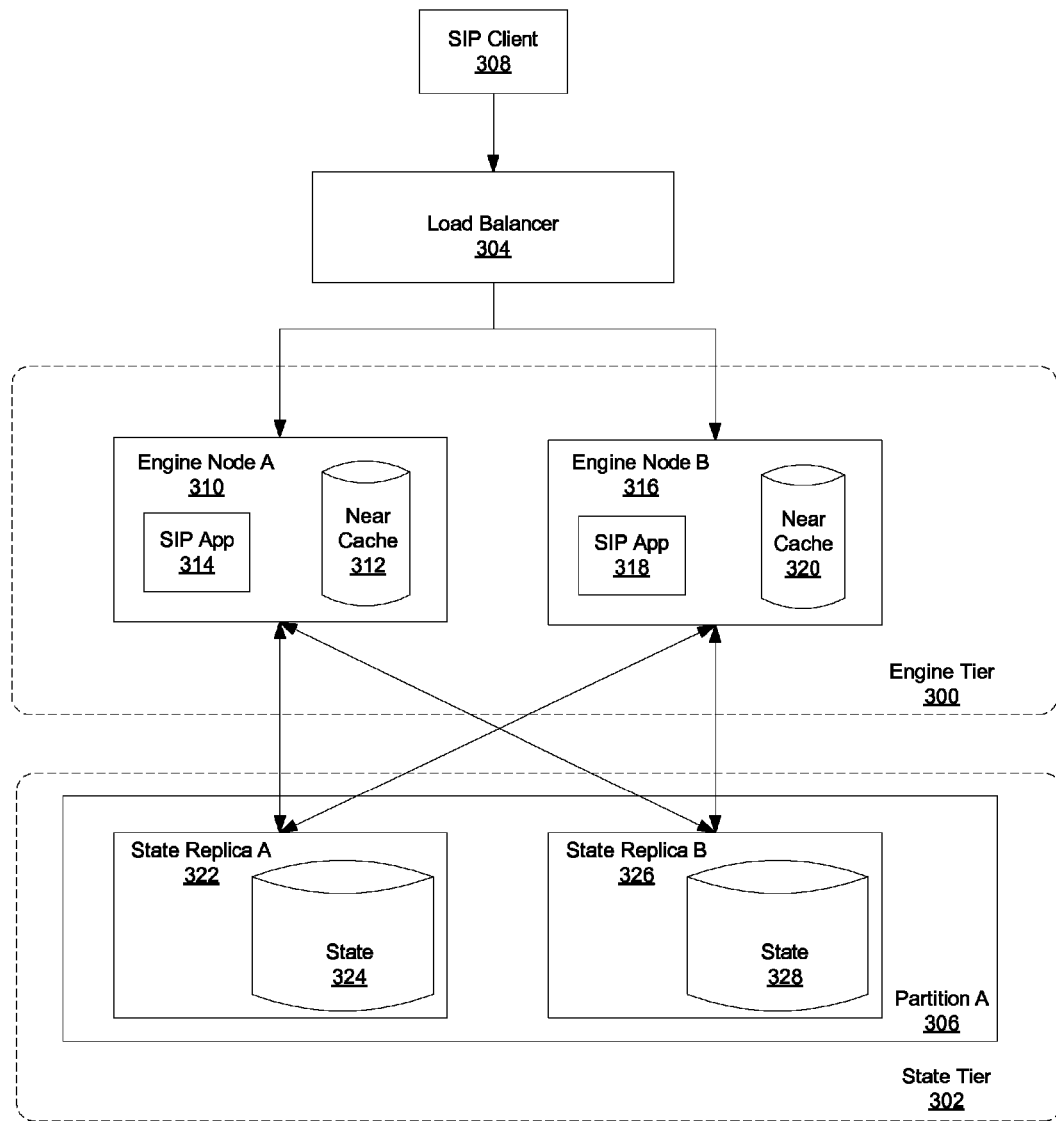
FIG. 3 is an exemplary illustration of a near cache in the SIP server cluster architecture in accordance with various embodiments of the invention.

FIG. 3 is an exemplary illustration of the near cache implemented in the SIP server architecture, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the engine tier 300 can be comprised of multiple engine nodes such as engine node A 310 and engine node B 316 that have SIP applications 314, 318 running thereon which provide services to various SIP clients 308. A separate state tier 302 cluster can manage state data and the engine nodes can fetch and write state in the state tier as necessary. The state tier can include a number of partitions (such as partition A 306) which can have state replicas 322, 326 for maintaining duplicate state 324, 328 thereon. The engines can write call state data to multiple replicas in each partition in order to provide automatic failover should a state tier replica go offline.

In one embodiment, the engine nodes are not entirely stateless, but implement a RAM-based near cache 312, 320 that maintains a portion of the call state 324, 328 locally, as well as in the state tier. When such a near cache is used, an engine tier server can first check its local cache for existing call state data when processing various messages. In one embodiment, if the cache contains the data needed by the engine server, and if the local copy is up to date (when compared to the state tier copy), the engine node can lock the call state in the state tier but read directly from its cache. This can improve response time performance for the request because the engine does not have to retrieve the call state data from a data tier server.

Retrieving call state from the state tier can involve various costs. One such cost is the time duration of the communication and transporting the state data between the engine node and a state replica. Another such cost is the time for serialization and de-serialization of the call state. In modern systems, serialization is used to transmit an object or data over the network as a series of bytes. De-serialization involves using these bytes on the receiving end in order to re-construct the object (or a copy thereof). As an illustration, the Java programming language provides automatic serialization and may require that the object be marked by implementing the java.io.Serializable interface. Java can then handle the serialization internally.

In various embodiments, such serialization and de-serialization can introduce latency which in certain cases may be undesirable. For example, during an initial call set up, the SIP server can receive a flurry of initial messages from several SIP clients. It may be advantageous to maintain a local copy of the state on the engine server while handling this flurry of messages, instead of repeatedly accessing the state tier upon every message. Maintaining such a local copy can prevent the need to serialize and de-serialize the state data each time since it does not need to be transported across the network.

Call state can be moved into an engine's local cache as needed to respond to SIP client 308 requests or to refresh out-of-date state data. If the cache is full when a new call state should be written to the cache, the least-used call state entry can be removed from the cache and the new entry written.

In various embodiments, the local cache can be further beneficial when a SIP-aware load balancer 304 is used to manage SIP client requests to the engine tier cluster. With a SIP-aware load balancer, all of the requests for one call leg can be directed to the same engine tier server, which can improve the effectiveness of the cache. For example, if the load balancer is not SIP-aware, subsequent messages/requests for the same call could be distributed to different engine tier servers which may have different cache contents and thus the performance benefit of the near cache can be inhibited. Even in such embodiments, however, some performance improvements can be realized as there should be at least some cache hits. On the other hand, when messages for the same call leg are distributed to the same engine node, it is more likely that the engine node has the state needed for the message stored locally in the near cache. In this manner, latency can be further improved.

In some embodiments, there may be a tension between using too large a near cache and reducing latency caused by garbage collection. Since objects in the near cache can be complex or long lived objects, it may be more difficult for the garbage collector to remove them in order to clean up the memory. This can introduce latency, as previously discussed. On the other hand, using the near cache can reduce the time costs of communicating, transporting, serializing and deserializing data. Therefore, it may be preferable to tune various factors such as the size of the cache, the JVM and its garbage collection to a proper balance in order to achieve maximum performance output. As an illustration, latency can be monitored as the maximum size of the near cache is adjusted. This can be used to determine the optimal size of the cache for a particular network. For example, a cache hits counter can be maintained and incremented whenever a "lockAndGetCallState" returns a non null value from the cache. Further alternatives include experimenting with different sizes of the cache and expiration characteristics (such as the least-recently-used scheme) to help determine the recommended settings for different call rates/flows and different deployments, including engine/partition ratio and load balancer features.

Another option may be to store the call state as a byte array (the form in which it is received from the state tier) and deserializing on demand. This may cause slower individual access, but may decrease garbage collection pauses. In various embodiments, a proper balance can be determined by a system administrator or other technical person in order to maximize the performance of the near cache and the SIP server.

The cache can be an object cache residing on each of the engine nodes in the engine tier and it can contain a portion of the same information that is contained in the state tier. In some embodiments, the near cache can be implemented as a bounded map of call states indexed by call ID.

In various embodiments, call states, both in the near cache and in the state tier can be associated with a version. This may be useful in processing synchronous message interaction between several SIP clients when the call state cannot be updated simultaneously. In some cases, the SIP protocol (and thus call state) can be sensitive to the particular order of the messages arriving to/from the SIP server. For example, during a conference call SIP session, two users may pick up at the same time. In some embodiments, those messages may need to be processed synchronously (one at a time) in order to ensure the integrity and accuracy of the call state. In those embodiments, locking and versioning the call state can enable the near cache to ensure correctness of the state.

In one embodiment, the near cache can be used in conjunction with fetching as well as writing to the state tier. For example, during a "get and lock" call state, before fetching from a state replica, the engine can first perform a search in the near cache. Versioning information about the cached version can be passed to the state replica(s) and the replica can respond by returning versioning information about the call state. If the version in the cache is up to date, the engine can then read the call state from the near cache while still locking that call state in the state tier. Thus, while locking and versioning information are passed between the engine and the state tiers, the engine may not need to transport the call state itself from the state tier and may save on serializing and de-serializing the data.

In lock and get message processing, the engine can pass the version to the state tier when it executes a lock and get. Then, the lock and get can return the call state from the state tier if the version is out of date, otherwise, it can be readily available from the cache. In put and unlock message processing, the engine server can save call state and versioning information in the near cache before writing the state to the replicas. In get and tock timers message processing, the state tier can transmit the call state bytes but the state can be retrieved from the cache (assuming proper version) saving on the de-serialization costs.

In various embodiments, the near cache can be integrated with handling of the timer objects as discussed in further detail below. For example, when timers fire and the engine tier may need call state in order to process the message specified by the timer, that state can be readily available in the near cache. In this manner, the engine can also save on the data transport costs during the execution of various timer objects.

Figure 4A:
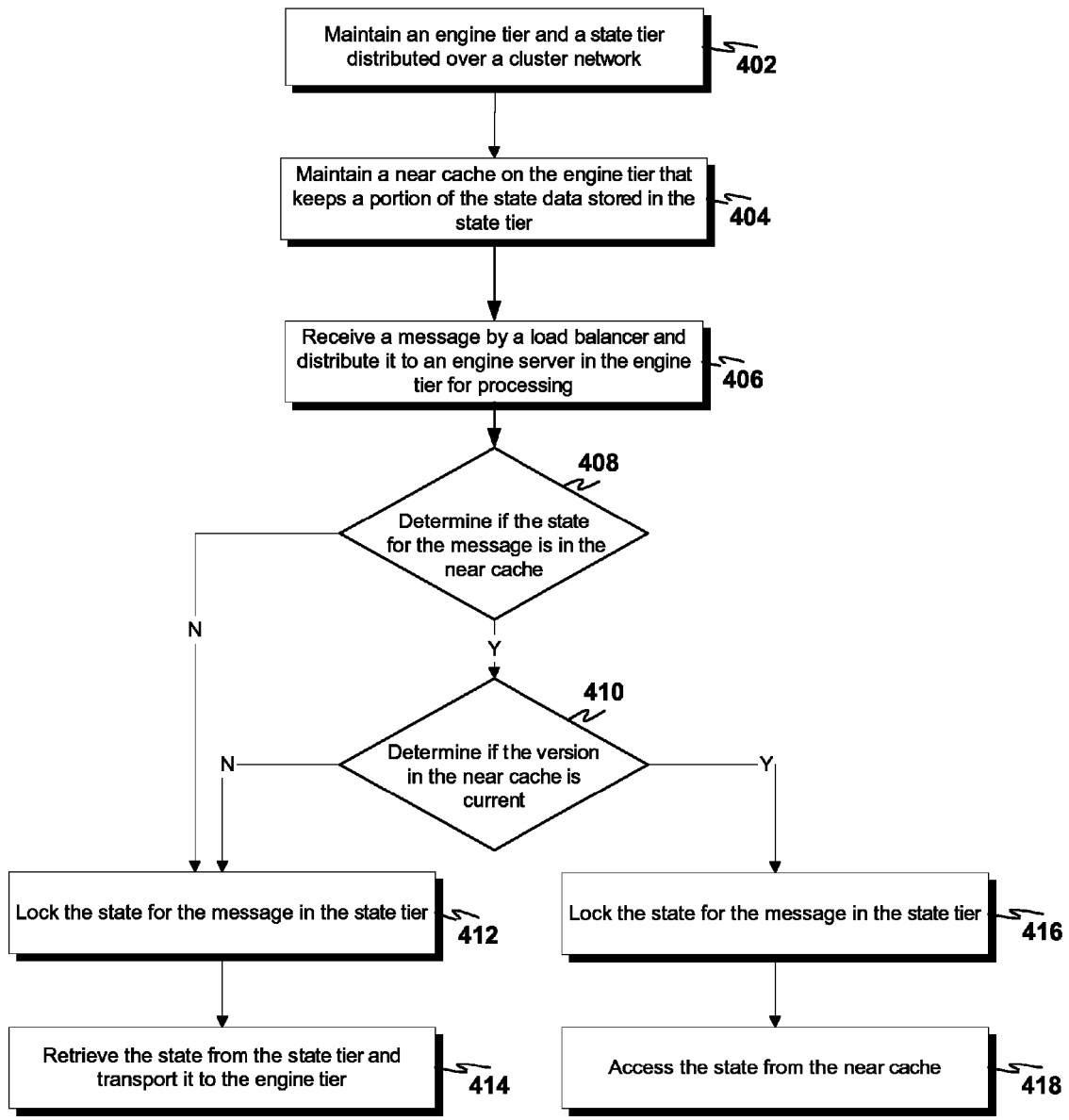
FIG. 4A is an exemplary flow diagram of the near cache functionality, in accordance with various embodiments.

FIG. 4A is an exemplary flow diagram of the near cache functionality, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 402, a cluster network of computers can maintain an engine tier and a state tier distributed thereon. The engine tier can handle the processing of various messages and store mainly short lived objects to be employed thereby. The state tier can store the state associated with an SIP message, including long lived objects which may be used in processing the message.

In step 404, a near cache can be maintained in the engine tier, in order to store a portion of the state data that is stored on the state tier. This portion of the state can be used when processing messages that frequently used the state. For example, during an initial call setup, the SIP server may receive a high period of message activity for one call, where each message can use the state data from the state tier. Rather than accessing it from the state tier upon each message, it may be helpful to maintain a local copy on the engine tier in the near cache. In step 406, a SIP communication message can be received to the load balancer in the cluster network. The transmission of the message can come from various devices or software, such as a cellular phone, a wireless device, a laptop computer, an application, or can be specified by various timer objects which have fired. The load balancer can then distribute the SIP message to an appropriate engine server node in the engine tier. The load balancer can be a hardware device whose primary goal is to provide a single IP address to the message clients and to distribute the incoming traffic to the engine tier.

In step 408, the engine server can determine whether the state needed to process the message is available in the near cache. If the state is available, the engine node can then check if the version currently in the near cache is up to date, as illustrated in step 410. This may be useful for keeping the state data consistent across the state tier and the near cache.

In step 416, if there is a current version of the state data in the near cache, the engine server can lock the state data in the state tier. This can be useful for synchronously processing incoming messages and in order to ensure the accuracy of the state, as previously discussed. The version in the near cache can then be accessed and employed by the engine tier in processing the message, as illustrated in step 418.

On the other hand, if there is no state for the message in the near cache, or if the version stored in the near cache is out of date, the engine tier may then decide to retrieve the state form the state tier. The state data can be locked first, as illustrated in step 412, and the data can then be retrieved from the state tier and transported to the engine tier to be used there, as illustrated in step 414. Such retrieval and transporting of data can be costly, as previously discussed. Thus for example, the near engine cache can improve latency by reducing on time taken for serializing, transporting and deserializing the state by having a local version on the engine tier.

As noted, however, the steps illustrated herein can be rearranged omitted, combined or new steps can be added as well. For example, the engine tier can send a lock and get message to the state tier along with the version of the state in the near cache. The state tier can then respond by sending the state if the version is expired, otherwise the engine tier can use the version in the near cache. Other such implementations are also possible and well within the scope of the invention.

Figure 4B:
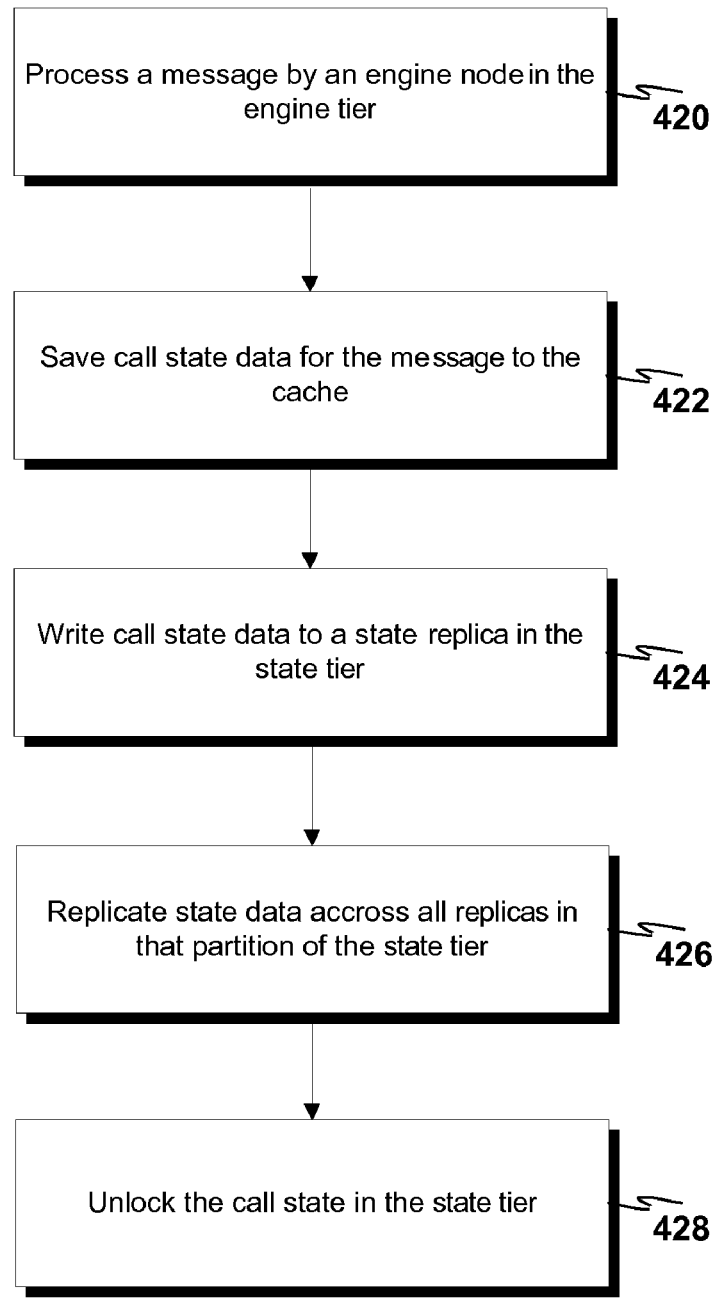
FIG. 4B is an exemplary flow diagram of the engine tier message processing, in accordance with various embodiments.

FIG. 4B is an exemplary flow diagram of the engine tier message processing, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 420, the engine tier can be responsible for processing various messages. For example, an engine node can receive incoming message from the load balancer or can receive directions to send a message from the state tier. The engine node can then gain access to the state needed to process the message, as previously discussed.

After processing the message, the engine node can save the state that was used in the near engine cache, as illustrated in step 422. This may include updating the version in the cache as well as updating the state data itself.

The state data can then be written to a state replica in the appropriate partition of the state tier, as illustrated in step 424. If failover is desired, that state can also be duplicated across other state replicas in the partition, as illustrated in step 426. At this point, as illustrated in step 428, the piece of call state can be unlocked within the state tier so that other engine nodes processing other messages that may need that same state can use it accordingly. This can help to ensure synchronous call and message processing as described in further detail below.

Figure 4C:
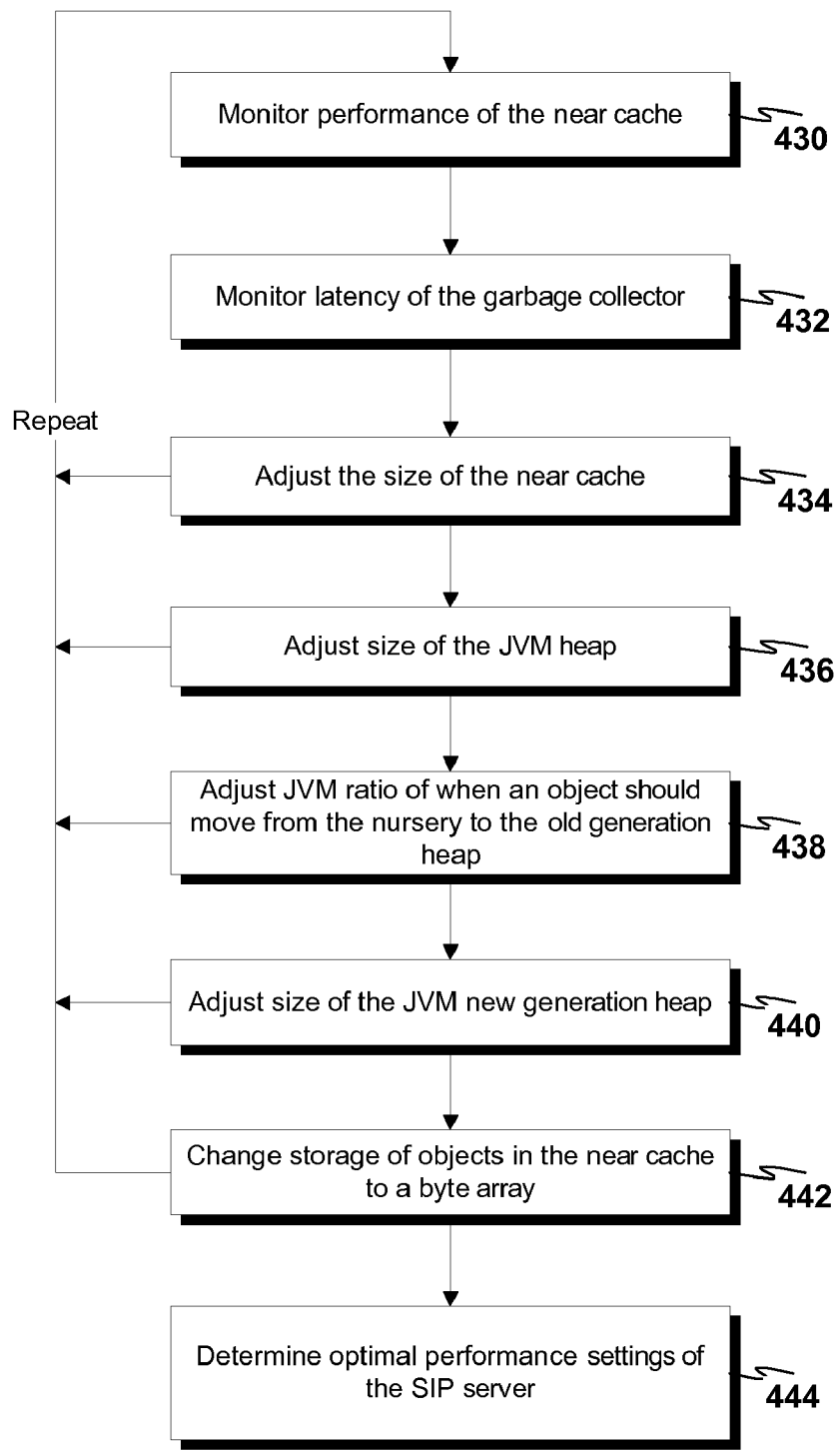
FIG. 4C is an exemplary flow diagram of tuning the performance of the near engine cache, in accordance with various embodiments.

FIG. 4C is an exemplary flow diagram of tuning the performance of the near engine cache, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 430, the performance of the near engine cache within the SIP server can be continually monitored. Similarly, as illustrated in step 432, the latency caused by various garbage collection algorithms can also be monitored. For example, monitoring can be performed by running varying amounts of call flow traffic and applications on the SIP server and measuring the time taken to process that traffic. A system administrator may implement an assortment of tools in order to monitor performance and latency, such as a counter of hits to the near cache, a proportion of those hits that return a current version, time intervals during which execution of various threads is halted by the garbage collector, average time taken to process a message, as well as various other tools. By weighing the latency that may be introduced by garbage collection against the benefit obtained by the near engine cache, an optimal performance of the SIP server can be determined.

In various embodiments, an administrator can tune the performance of the SIP server and the near engine cache. For example, in step 434, the size of the near cache can be adjusted to suit the particular network and call flow. Similarly, the expiration of objects in the near cache can be adjusted to be longer or shorter lived.

In step 436, the size of the Java Virtual Machine (JVM) heap can be adjusted so as to reduce garbage collection latency. The JVM heap is typically where the objects of a Java program live. In various embodiments, the JVM heap is a repository for live objects, dead objects and free memory. The JVM heap size can determine how long or how often the JVM will perform garbage collection. In one embodiment, if you set a large heap size, garbage collection may occur less frequently but can take longer to finish. Similarly, smaller heap sizes can speed up the garbage collection but may cause it to occur more frequently. Adjusting the size of the JVM heap can help to set most favorable performance of the SIP server.

In step 438, the JVM ratio of when objects should move from the new generation heap (nursery) to the older generation heap can be adjusted. In various embodiments, the JVM heap can store short lived objects in the new generation heap and the long lived objects in the old generation heap. The size of these heaps can be similarly adjusted, as illustrated in step 440, in order to maximize performance.

Further adjustments can also include changing the storage of objects in the near cache to an array of bytes which can be deserialized on call, as illustrated in step 442. The adjusting of various factors discussed above, can be repeated, arranged, interrupted or omitted as performance of the SIP server is monitored. As an illustration, a system administrator can adjust one of the parameters discussed above, monitor performance, adjust another parameter, monitor any change in performance and so on. In various embodiments, this can enable an administrator to determine the optimal or near-optimal performance of the near cache and the SIP server. These performance settings may differ across the various organizations that implement the SIP server, due to factors such as call flow volume, size of the cluster network, amount of data processed as well as a multitude of other factors. The methodology illustrated in FIG. 4C can help the organization improve its efficiency by adjusting the various factors influencing the SIP server.

Call Flow

Figure 5:
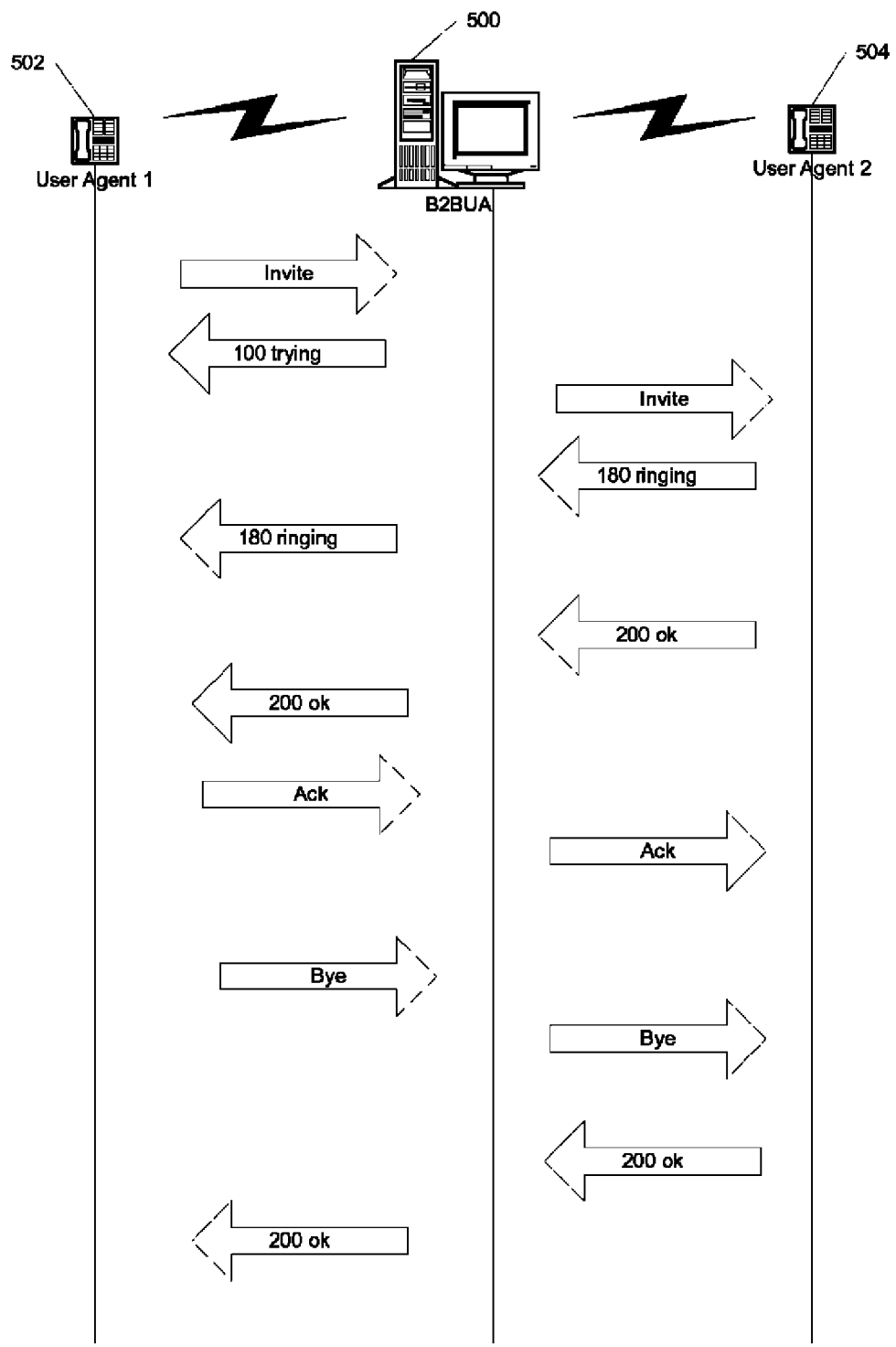
FIG. 5 is an exemplary illustration of a call flow in a typical SIP communication session, in accordance with various embodiments.

FIG. 5 is an exemplary illustration of a simplified call flow in a typical SIP communication session, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, a back to back user agent (B2BUA) 500, having a running SIP server thereon can take the place of being an intermediary between the communications sent between various users. This can be done for purposes of controlling the call and message flow between user agent 1 502 and user agent 2 504 and in order to prevent any unwanted behavior and messages (e.g. spamming, hacking, viruses, etc.) from being sent to the user agent device. It should be noted that although user agent 1 502 and user agent 2 504 are illustrated as telephones in FIG. 5, the SIP messages can come from various other sources as well. For example, the user agent can also be a cell phone, a wireless device, a laptop, an application or any other component that can initiate a SIP type of communication. Similarly, while FIG. 5 illustrates communications between two user agents (502, 504), there can be more such user agents taking part of a single communication session. For example, during a conference call, there may be 20 or 30 user agents for all attendees of the conference, each of which could send SIP messages to the B2BUA 500 and receive transmissions back therefrom.

Continuing with the illustration, a telephone call can be set up between user agent 1 502 and user agent 2 504 via the use of the SIP server. The first message sent from user agent 1 502 to the SIP server on the B2BUA 500 can be an invite message, requesting to set up a telephone call with user agent 2 504. The invite message can be received by the load balancer 202 of the SIP server and it can be directed to an engine in the engine tier 210 for processing.

In various embodiments, the engine tier (e.g. an application executing thereon) can then perform logic for determining various factors associated with the call, such as determining whether user agent 1 502 is allowed to make the type of call attempted to be initiated, determining whether the callee that will be contacted is properly identified, as well as any other logic that the server may need to calculate before attempting to set up a telephone call. The engine can then generate state around the fact that a call is being set up, including generating the proper long lived and short lived objects associated with the messages, as previously discussed. The engine can also determine how to find the target of the call (i.e. user agent 2 504) and the right path to route the message to the callee. As illustrated herein, user agent 1 is an originator (as well as the terminator) of the call and user agent 2 is referred to as the callee.

After receiving the invite message, the SIP server can send a "100 trying" message back to user agent 1 502, indicating that it has received the invite message and that it is in the process of handling it. The "100 trying" message is part of the SIP protocol definition and can be used by a server in order to stop the user agent from re-transmitting the invite request. In cellular phone environments, the user agent may have interference which might cause an interruption or loss of various messages. Therefore SIP protocol defines various re-transmission schemes in order to handle such mobility and interruptions. Messages such as "100 trying," "180 ringing," and "200 OK" are just some of the examples of messages defined in SIP for handling communication.

Continuing with the illustration, the SIP server can then send an invite message to the user agent 2 504 and can receive back a "180 ringing" message, indicating that user agent 2 504 has received the invitation and is now waiting for a user to answer. The SIP server engine tier can then transmit the "180 ringing" message back to user agent 1 502. When a person finally answers the phone, user agent 2 504 can then send a "200 ok" message to the SIP server, the server can transmit that message to user agent 1 502. The user agent 1 502 can send an acknowledgement ("Ack" message) to the SIP server which can be transmitted along to user agent 2 504 and at this point a sound transfer conversation can be set up between the two user agents. This sound transfer can be implemented via real transfer protocol (RTP) on a media server. At the end of the conversation, either user agent can choose to terminate the call by sending a "Bye" message. In this illustration, user agent 1 502 terminates the call by sending a "Bye" message to the SIP server which sends it off to user agent 2 504. After receiving back a "200 ok" message from user agent 2, the SIP server can transmit that message to user agent 1 and the conversation can be truly ended.

In various embodiments, the vertical lines such as those extending downward from the user agents 502, 504 and the B2BUA 500 can each illustrate and be referred to as a single call leg. The call flow for each call leg may be time sensitive as some messages should be received or sent before others can be initiated. For example, as illustrated herein, the user agent A 502 may continue to re-transmit the initial invite message until it receives a "100 trying" message from the B2BUA 500. As such, in some cases certain messages may need to be processed synchronously while others may be allowed to process in parallel.

It should be noted that this illustration of a call may be overly simplified for purposes of clarity. For example, there can be various other message transmissions (not illustrated) such as authentication messages for caller/callee, determining the type of user agent the SIP server is communicating with and various other handshaking messages that can be exchanged between the SIP server and the user agents. Furthermore, message transmitting steps may be added, changed, interrupted or rearranged in case of interference or failure of various components.

Timer Objects

As previously discussed, in various embodiments there may be specific sequences of messages exchanged between the SIP server and the user agents for controlling the flow of the call. These sequences can be controlled by various timer objects residing on the SIP server. As a nonlimiting illustration, after receiving the invite message from one user agent, the SIP server will typically forward that invite to another user agent and wait for a response. If no response is received within a period of time (e.g. a number of milliseconds), then the invite message may need to be retransmitted to the second user agent because it may be assumed that the user agent did not receive the first message. This type of re-transmission can be controlled by the protocol timer objects which may be residing in the state tier. In one embodiment, an initial T1 timer value of 500 milliseconds can control the retransmission interval for the invite request and responses and can also set the value of various other timers.

In various embodiments, there are also other timer objects which can be executing on the level of the entire call. For example, if after a specified period of time, nothing is heard back from either user agent, the entire call may be purged from the system. This specified period of time can also be controlled by firing a timer object.

In one embodiment, as engine tier servers add new call state data to the state tier, state tier instances queue and maintain a complete list of SIP protocol timers and application timers associated with each call. Engine tier servers can periodically poll the partitions of the state tier to determine which timers have expired given the current time. In order to avoid contention on the timer tables, multiple engine tier polls to the state tier can be staggered. The engine tier can then process the expired timers using threads in the sip.timer.Default execute queue. Thus, the processing of the timer objects can be executed by the engine server as determined by the state tier server. For example, the state tier can tell the engine A to execute the first half of all due timer objects (e.g. 1-100) and tell engine B to execute the other half (e.g. 101-200). The state tier can also simultaneously push the state onto the engine, since the state may need to be employed in executing the timer objects. The engines can then process the timer objects (e.g. by sending appropriate messages, ending appropriate calls) and can later again query poll the state tier for which timers have become due.

When used with the near cache, the state data may not need to be pushed onto the engine server since that data may already be available in the cache. Thus, when processing timers, the timers can be fetched from the state tier, however upon the timer firing, the engine can fetch the call state using the cache. Further performance optimization can be obtained by changing the selection of tiers to give affinity to the engine holding the cache for a particular call. Thus, the timers which are going to be executed can be sent to the appropriate engines which have the proper call state in the cache thereon.

In various embodiments, it may be preferable to synchronize system server clocks to a common time source (e.g. within a few milliseconds) in order achieve maximum performance. For example, an engine tier server with a system clock that is significantly faster than other servers may process more expired timers than the other engine tier servers. In some situations this may cause retransmits to begin before their allotted time and thus care may need to be taken to ensure against it.

In various embodiments, the SIP Servlet API can provide a timer service to be used by applications. There can be TimerService interface which can be retrieved from as a ServletContext attribute. The TimerService can define a "createTimer(SipApplicationSession appSession, long delay, boolean isPersistent, java.io.Serializable info)" method to start an application level timer. The SipApplicationSession can be implicitly associated with the timer. When a timer fires, an application defined TimerListener is invoked and ServletTimer object passed up, through which the SipApplicationSession can be retrieved which provides the right context of the timer expiry.

Failover

In various embodiments, the engine tier servers continually access the state tier replicas in order to retrieve and write call state data. In addition, the engine tier nodes can also detect when a state tier server has failed or become disconnected. For example, in one embodiment, when an engine cannot access or write call state data for some reason (e.g. the state tier node has failed or become disconnected) then the engine can connect to another replica in the partition and retrieve or write data to that replica. The engine can also report that failed replica as being offline. This can be achieved by updating the view of the partition and data tier such that other engines can also be notified about the offline state tier server as they access state data.

Additional failover can also be provided by use of an echo server running on the same machine as the state tier server. The engines can periodically send heartbeat messages to the echo server, which can continually send responses to each heartbeat request. If the echo server fails to respond for a specified period of time, the engines can assume that the state tier server has become disabled and report that state server as previously described. In this manner, even quicker failover detection is provided, since the engines can notice failed servers without waiting for the time that access is needed and without relying on the TCP protocol's retransmission timers to diagnose a disconnection.

Failover can also be provided for the engine tier nodes. As previously discussed, the engine tier nodes can periodically poll the state tier nodes in order to determine which timer objects it needs to execute. In turn, the state tier nodes can notice whenever the engine tier node has failed to poll. If a specified period of time elapses and the engine tier has not polled the state tier, the state server can then report that engine as unavailable (e.g. having failed or disconnected from the network). In this manner, failover can be implemented for both the state tier and the engine tier, thereby providing a more reliable and secure cluster for message processing.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing systems and methods for providing the SIP server architecture as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. number of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer implemented method for providing a near engine cache in a network environment, comprising:
    maintaining an engine tier distributed over a cluster network, said engine tier including one or more engine nodes that process one or more messages;
    maintaining a state tier distributed over the cluster network, said state tier including one or more replicas that store state data associated with the messages;
    continuously receiving the messages by the engine nodes and processing the messages by reading the state data from the replicas to the engine nodes and modifying the state data in the state tier;
    storing a local copy of a portion of the state data onto a near cache residing on the one or more engine nodes after processing the messages in the engine tier;
    receiving a message by an engine node after storing the local copy in the near cache;
    determining, by said engine node upon receiving the message, whether the local copy of the portion of the state data associated with the message in the near cache on said engine node is current with respect to the state tier; and
    wherein if the local copy in the near cache is determined to be current, then the engine node locks the state data in the state tier and uses the local copy of the state data from the near cache to process the message and wherein if the local copy in the near cache is determined to be stale, the engine node locks the state data in the state tier and retrieves the state data from the state tier, and wherein if the state data is retrieved from the state tier, then said state data is deserialized prior to using the state data to process the message at the engine node;
    wherein retrieving the state data from the state tier further comprises:
    serializing the state data and transporting it to the engine tier; and
    deserializing the state data in the engine tier; and
    wherein using the local copy from the near cache is performed without serializing and deserializing the local copy of the portion of the state data; and
    adjusting the size of the near cache in order to achieve a balance between latency introduced by garbage collection and latency reduced by elimination of serializing and deserializing the state data.

2. The method of claim 1 wherein the state data is maintained in random access memory (RAM) on the state tier and on the near cache.

3. The method of claim 1 wherein the state data in the near cache is implemented as a bounded map of call states indexed by call ID.

4. The method of claim 1 further comprising:
    providing one or more timer objects for specifying to the engine tier when to process the incoming messages wherein the timer objects are integrated with the near cache such that the state data can be accessed from the near cache by the engine tier while processing messages specified by the timer objects.

5. The method of claim 1 wherein receiving a message further comprises:
    receiving the message by a load balancer; and
    distributing the message to an engine node in the engine tier;
    wherein the load balancer distributes all messages associated with a same call leg to the same engine node in the engine tier.

6. The method of claim 1 further comprising:
    saving the state data in the near cache after processing the message; and
    writing the state data to the state tier.

7. The method of claim 1, further comprising:
    tuning performance of the near cache by adjusting one or more of the following: a size of the near cache, a size of a Java Virtual Machine (JVM) heap, and a JVM ratio of when objects are moved from a new generation heap to an older generation heap; wherein the step of tuning the performance of the near cache is performed while monitoring a cache hit counter that indicates successful state data reads from the near cache.

8. A system for providing a near cache for a network environment, said system comprising:
one or more processors and a set of instructions, said one or more processors executing the set of instructions to implement:
an engine tier distributed on a cluster network, said engine tier including one or more engine nodes that receive and process messages;
a state tier distributed on the cluster network, said state tier including one or more replicas that maintain state data associated with the messages such that the one or more engine nodes of the engine tier retrieve the state data maintained in the state tier in order to process the messages; and
a near cache residing on the one or more engine nodes in the engine tier, said near cache storing a local copy of a portion of the state data maintained in the state tier such that the state data from the near cache is accessible to the one or more engine nodes;
wherein the engine nodes continuously receive the messages and processing said messages by reading the state data from the replicas to the engine nodes and modifying the state data in the state tier;
wherein upon receiving the messages, the one or more engine nodes determine whether the local copy of the portion of the state data stored in the near cache on said engine node is current with respect to the state tier; and
wherein if the local copy in the near cache is determined to be current, then the one or more engine nodes lock the state data in the state tier and employ the local copy of the state data from the near cache to process the message and wherein if the local copy in the near cache is determined to be stale, the engine node locks the state data in the state tier and retrieves the state data from the state tier, and wherein if the state data is retrieved from the state tier, then said state data is deserialized prior to using the state data to process the message at the engine node;
wherein retrieving the state data from the state tier further comprises: serializing the state data and transporting the state data to the engine tier; and
deserializing the state data in the engine tier; and
wherein employing the local copy from the near cache is performed without serializing and deserializing the local copy of the portion of the state data; and
wherein the size of the near cache is adjusted in order to achieve a balance between latency introduced by garbage collection and latency reduced by elimination of serializing and deserializing the state data.

9. The system of claim 8 wherein the state data is maintained in random access memory (RAM) on the state tier and on the near cache.

10. The system of claim 8 further comprising:
one or more timer objects for specifying to the engine tier when to process the incoming messages wherein the timer objects are integrated with the near cache such that the state data can be accessed from the near cache by the engine tier while processing messages specified by the timer objects.

11. The system of claim 8 further comprising:
a load balancer that receives an incoming message and distributes the message to an engine node in the engine tier for processing wherein the load balancer distributes all messages associated with a same call leg to the same engine node in the engine tier.

12. The system of claim 8 wherein the state data is saved into the near cache after processing the message and wherein the state data is written into the near cache.

13. The system of claim 8, wherein a performance of the near cache is tunable by adjusting one or more of the following: a size of the near cache, a size of a Java Virtual Machine (JVM) heap, and a JVM ratio of when objects are moved from a new generation heap to an older generation heap; wherein the step of tuning the performance of the near cache is performed while monitoring a cache hit counter that indicates successful state data reads from the near cache.

14. A non-transitory computer readable storage medium having instructions stored thereon which when executed by one or more processors cause the one or more processors to:
maintain an engine tier distributed over a cluster network, said engine tier including one or more engine nodes that process one or more messages;
maintain a state tier distributed over the cluster network, said state tier including one or more replicas that store state data associated with the messages;
continuously receive the messages by the engine nodes and process the messages by reading the state data from the replicas to the engine nodes and modifying the state data in the state tier;
store a local copy of a portion of the state data onto a near cache residing on the one or more engine nodes after processing the messages in the engine tier;
receive a message by an engine node after storing the local copy in the near cache;
determine, by said engine node upon receiving the message, whether the local copy of the portion of the state data associated with the message in the near cache on said engine node is current with respect to the state tier; and
wherein if the local copy in the near cache is determined to be current, then the engine node locks the state data in the state tier and uses the local copy of the state data from the near cache to process the message and wherein if the local copy in the near cache is determined to be stale, the engine node locks the state data in the state tier and retrieves the state data from the state tier, and wherein if the state data is retrieved from the state tier, then said state data is deserialized prior to using the state data to process the message at the engine node;
wherein retrieving the state data from the state tier further comprises: serializing the state data and transporting the state data to the engine tier; and
deserializing the state data in the engine tier; and
wherein employing the local copy from the near cache is performed without serializing and deserializing the local copy of the portion of the state data; and
wherein the size of the near cache is adjusted in order to achieve a balance between latency introduced by garbage collection and latency reduced by elimination of serializing and deserializing the state data.

* * * * *

UNITED STATES PATENT AND TRADEMARK OFFICE
CERTIFICATE OF CORRECTION

| | | |
|---|---|---|
| PATENT NO. | : 8,112,525 B2 | Page 1 of 1 |
| APPLICATION NO. | : 11/748791 | |
| DATED | : February 7, 2012 | |
| INVENTOR(S) | : Langen et al. | |

It is certified that error appears in the above-identified patent and that said Letters Patent is hereby corrected as shown below:

On cover page, in column 2, under "Other Publication", line 2, delete "/entisr/" and insert -- /en/jsr/ --, therefor.

On sheet 7 of 9, in figure 4B, Reference Numeral 426, line 1, delete "accross" and insert -- across --, therefor.

In column 11, line 29, delete "In put" and insert -- Input --, therefor.

Signed and Sealed this
Eighth Day of May, 2012

David J. Kappos
*Director of the United States Patent and Trademark Office*